(12) United States Patent
Banerjee et al.

(10) Patent No.: US 12,189,146 B2
(45) Date of Patent: Jan. 7, 2025

(54) FIVE-LAYER THIN FILM STRUCTURES COMPRISING A METALLIC IRON ABSORBER

(71) Applicant: Toyota Motor Engineering & Manufacturing North America, Inc., Plano, TX (US)

(72) Inventors: Debasish Banerjee, Ann Arbor, MI (US); Songtao Wu, Ann Arbor, MI (US); Hidetaka Asano, Nisshin (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 724 days.

(21) Appl. No.: 17/161,860

(22) Filed: Jan. 29, 2021

(65) Prior Publication Data
US 2022/0244436 A1  Aug. 4, 2022

(51) Int. Cl.
*G02B 5/00* (2006.01)
*G02B 5/08* (2006.01)
*G02F 1/1333* (2006.01)
*G02F 1/1335* (2006.01)

(52) U.S. Cl.
CPC ........... *G02B 5/003* (2013.01); *G02B 5/0808* (2013.01); *G02F 1/133345* (2013.01); *G02F 1/1335* (2013.01)

(58) Field of Classification Search
CPC ............ G02F 1/1335; G02F 1/133345; G02B 5/0858; G02B 5/0808; G02B 5/003; G02B 5/285
See application file for complete search history.

(56) References Cited

U.S. PATENT DOCUMENTS

| | | | | |
|---|---|---|---|---|
| 5,214,530 | A | * | 5/1993 | Coombs ................. G02B 5/285 359/359 |
| 6,686,042 | B1 | | 2/2004 | LeGallee |
| 7,699,350 | B2 | * | 4/2010 | Heim ................... G03H 1/0011 359/585 |
| 9,739,917 | B2 | | 8/2017 | Banerjee et al. |
| 2014/0268332 | A1 | | 9/2014 | Guo et al. |
| 2017/0369709 | A1 | * | 12/2017 | Seydel .................... C09C 1/003 |
| 2018/0126771 | A1 | | 5/2018 | Dickerson et al. |

FOREIGN PATENT DOCUMENTS

JP  2019131791 A  8/2019

\* cited by examiner

*Primary Examiner* — Dung T Nguyen
(74) *Attorney, Agent, or Firm* — Dinsmore & Shohl LLP

(57) ABSTRACT

A five-layer thin film structure including a reflector, a high refractive index layer on or encapsulating the reflector, and a metallic iron absorber layer on or encapsulating the high refractive index layer. The reflector has a thickness from 10 nm to 5000 nm, the high refractive index layer has a thickness from 5 nm to 500 nm; and the metallic iron absorber layer has a thickness from greater than 0 nm to 50 nm.

20 Claims, 4 Drawing Sheets

FIVE-LAYER THIN FILM STRUCTURES COMPRISING A METALLIC IRON ABSORBER

FIELD

The present application is related to five-layer thin film structures, and in particular to omnidirectional structural color five-layer thin film structures comprising a metallic iron absorber.

BACKGROUND

Previously disclosed multilayer thin film structures that provide omnidirectional structural color (OSC) contain layers of metal oxides having a high refractive index and thin layers of metals as absorbers. However, some metal oxides used as the high refractive index layer and some metals used as the metal absorber may be unsuitable for certain consumer applications such as, for example, cosmetics and textiles.

Accordingly, multilayer thin film structures that provide OSC and that comprise materials suitable for consumer application are desired.

SUMMARY

According to embodiments, a five-layer thin film structure comprises: a reflector; a high refractive index layer on or encapsulating the reflector; and a metallic iron absorber layer on or encapsulating the high refractive index layer.

According to embodiments, the reflector has a thickness from 10 nm to 5000 nm, the high refractive index layer has a thickness from 5 nm to 500 nm, and the metallic iron absorber layer has a thickness from greater than 0 nm to 50 nm.

According to embodiments, a five-layer thin film structure comprises: an aluminum reflector; an iron oxide high refractive index layer on or encapsulating the aluminum reflector; and a metallic iron absorber layer on or encapsulating the iron oxide high refractive index layer.

According to embodiments, the aluminum reflector has a thickness from 10 nm to 5000 nm, the iron oxide high refractive index layer has a thickness from 5 nm to 500 nm, and the metallic iron absorber layer has a thickness from greater than 0 nm to 50 nm.

Additional features and advantages will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
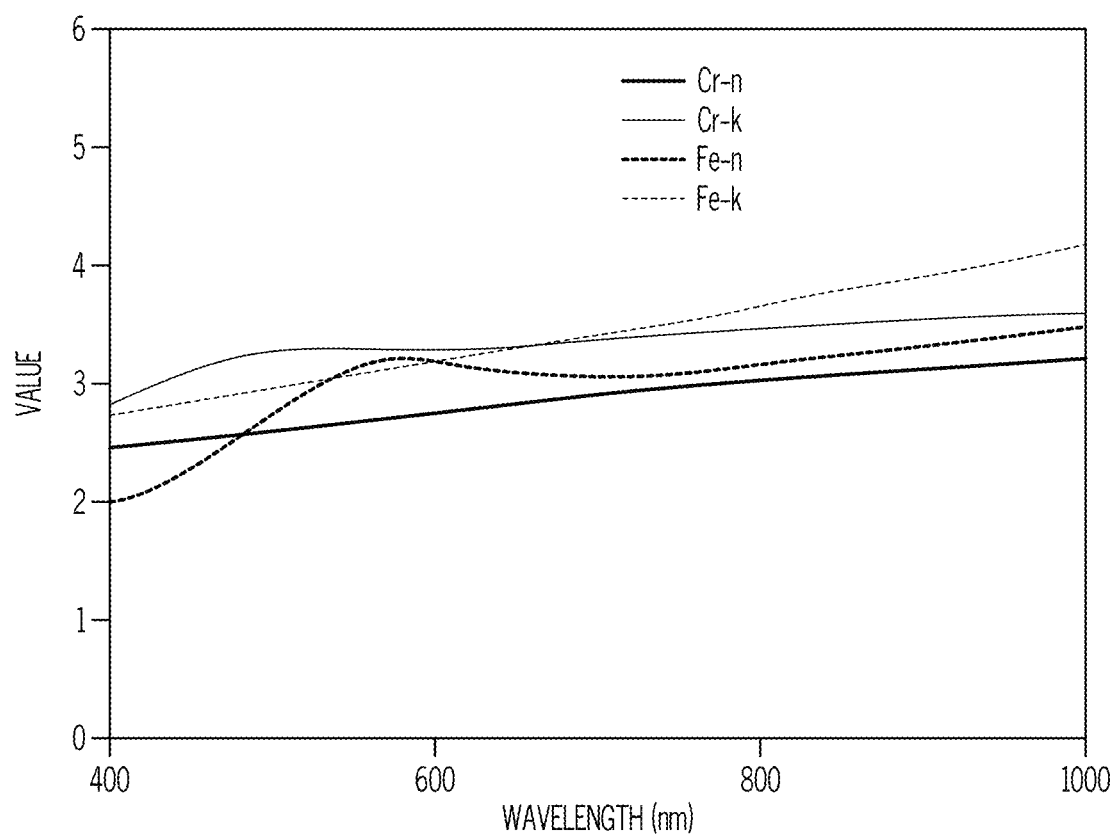
FIG. 1 graphically depicts the refractive index (n) and extinction coefficient (k) of chromium and iron.

As noted above, some metal oxides used as high refractive index layers and some metals used as absorber layers are not suitable for use in consumer products. For instance, chromium (Cr) is a commonly used metallic absorber material because chromium is a good absorber and is easy to deposit. However, certain forms of chromium may be toxic and are, therefore, not suitable for all consumer applications such as, for example cosmetics and textiles. Accordingly, it is desirable to replace chromium as the absorber material in five-layer thin film structures with absorber materials that are more friendly to consumers and that still exhibit good OSC properties. The absorber materials that replace chromium absorbers in five-layer thin film structures should also be capable of being deposited in the five-layer thin film structure safely in both small and large-scale production processes.

Traditionally, high refractive index metal oxide layers and metal absorber layers may be applied in the five-layer thin film structure by methods such as physical vapor deposition (PVD) and sputtering. In some instances, the five-layer thin film is first formed in large sheet that comprises a reflector layer and various combinations of high refractive index metal oxide layers and metal absorber layers. This large sheet can then be broken apart by mechanical means and processed to form small particles of five-layer thin film structures that can be used as pigments in products such as, for example, paint, cosmetics, and textiles.

Initially, it was thought that tungsten (W) might be a good replacement for chromium as the metal absorber material. At small-scale production, tungsten performed quite well and five-layer thin film structures comprising a tungsten metal absorber layer provided OSC properties comparable to five-layer thin film structures having chromium metal absorber layers. However, to apply tungsten as a metal absorber layer in a five-layer thin film structure, one must reduce tungsten oxide to metallic tungsten. The reduction of tungsten oxide is traditionally done under elevated temperature and elevated pressure conditions in the presence of hydrogen. When tungsten oxide is deposited on an aluminum reflector layer, which is a common reflector layer used in OSC five-layer thin film structures, and the tungsten oxide is reduced, the aluminum reflector layer can undergo an exothermic oxidation. This exothermic oxidation of aluminum combined with the hydrogen-based atmosphere used to reduce tungsten oxide can be a hazardous mixture, especially when done at large scale production. Therefore, while tungsten may be a suitable replacement for chromium absorber material in small-scale applications, tungsten is not a good candidate for large-scale applications. Accordingly, alternative metal absorber materials are desired.

Another material that may be a suitable replacement for chromium as a metal absorber material is metallic iron. As used herein, "metallic iron" refers to any iron isotope, but does not include oxides of iron. It should be understood, however, that metallic iron layers as described herein may, according to embodiments, contain trace amounts of iron oxide that are unintentionally formed as the various layers of the five-layer thin film are deposited upon one another.

One reason that metallic iron may be a good substitute for chromium is that metallic iron has very similar optical properties as chromium. With reference now to FIG. 1, the refractive index (n) and extinction coefficient (k) of chromium and iron are compared. As is commonly known, the refractive index (n) of a material is a comparison of the speed light in a vacuum to the phase velocity of light in the medium. This relationship is expressed as:

$$n = \frac{c}{v}$$

where n is the refractive index, c is the speed of light in a vacuum, and v is the phase velocity of light in the material. As shown in FIG. 1, the refractive index (n) of chromium oscillates between about 2.0 and about 3.0 at electromagnetic radiation wavelengths from 400 nm to 1000 nm, and the refractive index of metallic iron gradually increases from about 2.5 to about 3.0 at electromagnetic radiation wavelengths from 400 nm to 1000 nm. As is also commonly known, the extinction coefficient (k) describes the attenuation of light through a material. The extinction coefficient (k) can be expressed as:

$$k = \frac{2\pi}{\lambda}$$

Where k is the extinction coefficient and $\lambda$ is the desired wavelength of electromagnetic radiation. As can be seen from FIG. 1, the extinction coefficient (k) of chromium oscillates between about 2.75 and 3.25 at electromagnetic radiation wavelengths from 400 nm to 1000 nm, and the extinction coefficient of iron increases from about 2.75 to about 4.00 at electromagnetic radiation wavelengths from 400 nm to 1000 nm. FIG. 1 clearly shows that both chromium and metallic iron show similar refractive index (n) and extinction coefficient (k) values in the visible spectrum of electromagnetic radiation (i.e., from about 400 nm to about 700 nm). In addition, both the refractive index (n) and extinction coefficient (k) values of metallic iron are greater than 2.0, which shows that it is a good candidate to replace chromium as material in a metal absorber.

It will be understood that the terms "electromagnetic wave," "electromagnetic radiation," and "light," as used herein, may interchangeably refer to various wavelengths of light incidence on a five-layer thin film structure and that such light may have wavelengths in the ultraviolet (UV), infrared (IR), and visible portions of the electromagnetic spectrum.

In addition to having optical properties similar to chromium, metallic iron is also a good candidate for replacing chromium as a metal absorber in a five-layer thin film structure because iron is capable of being deposited into the five-layer thin film structure by low cost methods such as chemical vapor deposition (CVD) or other wet chemistry methods, which are known. This alleviates the need for more expensive deposition methods such as, for example, PVD or atomic layer deposition (ALD) methods. According to embodiments, and as will be discussed in more detail below, an iron oxide layer may be deposited in the appropriate position of a five-layer thin film structure through any suitable method such as, for example, CVD or other wet chemistry methods. Subsequently, in some embodiments, the entire deposited iron oxide layer is reduced to form a metallic iron absorber layer. In other embodiments, only a portion of the iron oxide layer is reduced to form a metallic iron absorber layer. The reduction of iron does not require the stringent conditions that are required to reduce tungsten and, therefore, exothermic oxidation of an aluminum reflector layer is not as likely as it was in the reduction of tungsten. Moreover, using this methodology allows one to control the thickness of the metallic iron absorber layer to nanometer scale thicknesses, which is important when forming OSC five-layer thin films because even slight variations in the thickness of the various layers in the five-layer thin film can have a drastic effect on the OSC properties of the five-layer thin film. Forming a metallic iron absorber layer in this way prevents the metallic iron layer from oxidizing during deposition or in weathering tests.

Figure 2A:
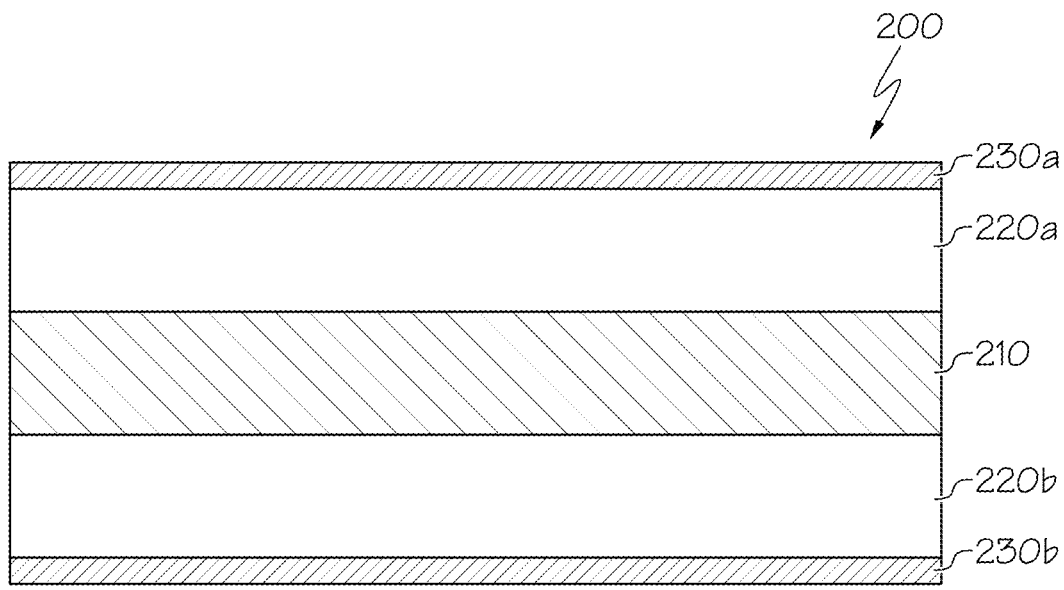
FIG. 2A schematically depicts a cross section of a five-layer thin film structure according to embodiments disclosed and described herein.

A five-layer thin film structure 200 according to one or more embodiments disclosed and described herein is provided in FIG. 2A. The five-layer thin film structure 200 of the embodiments disclosed in FIG. 2A comprise a reflector 210, a first high refractive index layer 220a on one side of the reflector 210, a second high refractive index layer 220b on a second side of the reflector 210, a first metallic iron absorber layer 230a on the first high refractive index layer 220a, and a second metallic iron absorber 230b on the second high refractive index layer 220b. As can be seen in FIG. 2A, the five-layer thin film structure 200 comprises symmetrical layers on either side of the reflector 210, such that the first and second high refractive index layers 220a, 220b are made from the same material and the first and second metallic iron absorber layers 230a, 230b are made from the same material.

Figure 2B:
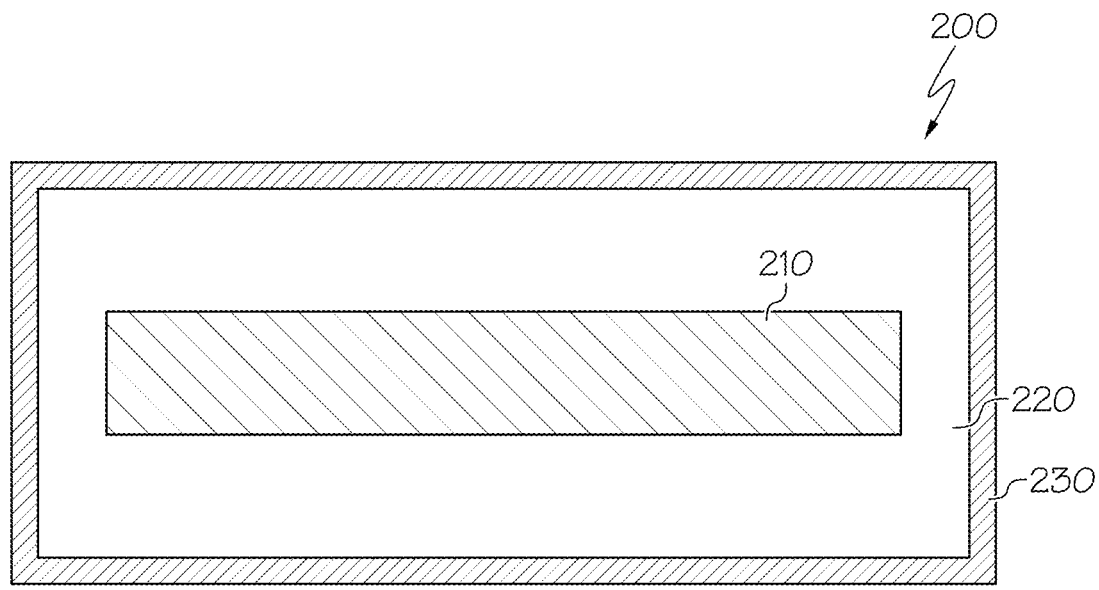
FIG. 2B schematically depicts of a cross section of an encapsulated five-layer thin film structure according to embodiments disclosed and described herein.

An alternative five-layer thin film structure 200 according to one or more embodiments disclosed and described herein is provided in FIG. 2B. The five-layer thin film structure of embodiments shown in FIG. 2B are formed using encapsulation methods for depositing the layers of the five-layer thin film structure 200. The five-layer thin film structure 200 of embodiments shown in FIG. 2B comprises a reflector 210, a high refractive index layer 220 that encapsulates the reflector 210 and a metallic iron absorber layer 230 that encapsulates the high refractive index layer 220. By using encapsulation methods, the high refractive index layer 220 is symmetrically deposited on all sides of the reflector 210, and the metallic iron absorber layer 230 is symmetrically deposited on all sides of the high refractive index layer 220, thereby having a similar structure to the five-layer thin film 200 of FIG. 2A, except that all sides of the five-layer thin film 200 in FIG. 2B comprise the high refractive index layer 220 and the metallic iron absorber layer 230. As used herein, "encapsulate" means that an encapsulating layer covers all sides of the layer that it encapsulates. It should be understood that "encapsulate" includes embodiments where the deposition method used to encapsulate unintentionally does not cover a portion of the layer that it encapsulates.

Referring again to FIGS. 2A and 2B, a five-layer thin film structure 200 according to embodiments disclosed and described herein comprises a reflector 210, a high-refractive index layer 220 on or encapsulating the reflector 210, and a metallic iron absorber layer 230 on or encapsulating the high refractive index layer 220.

In embodiments, the location of metallic iron absorber layers 230 may be chosen to increase the absorption of light wavelengths within a certain range, but reflect light in other wavelengths. For example, the location of a metallic iron absorber layer may be selected to have increased absorption of light waves less than or equal to 550 nm, but reflect light waves of approximately 650 nm, such as visible light outside of the hue between 10° and 30°. Accordingly, the absorbing layer is placed at a thickness where the electric field ($|E|^2$) is less at the 550 nm wavelength than at the 650 nm wavelength. Mathematically, this can be expressed as:

$$|E_{550}|^2 < < |E_{650}|^2 \quad (1)$$

or alternatively as:

$$|E_{650}|^2 \approx 0 \quad (2)$$

Figure 3:
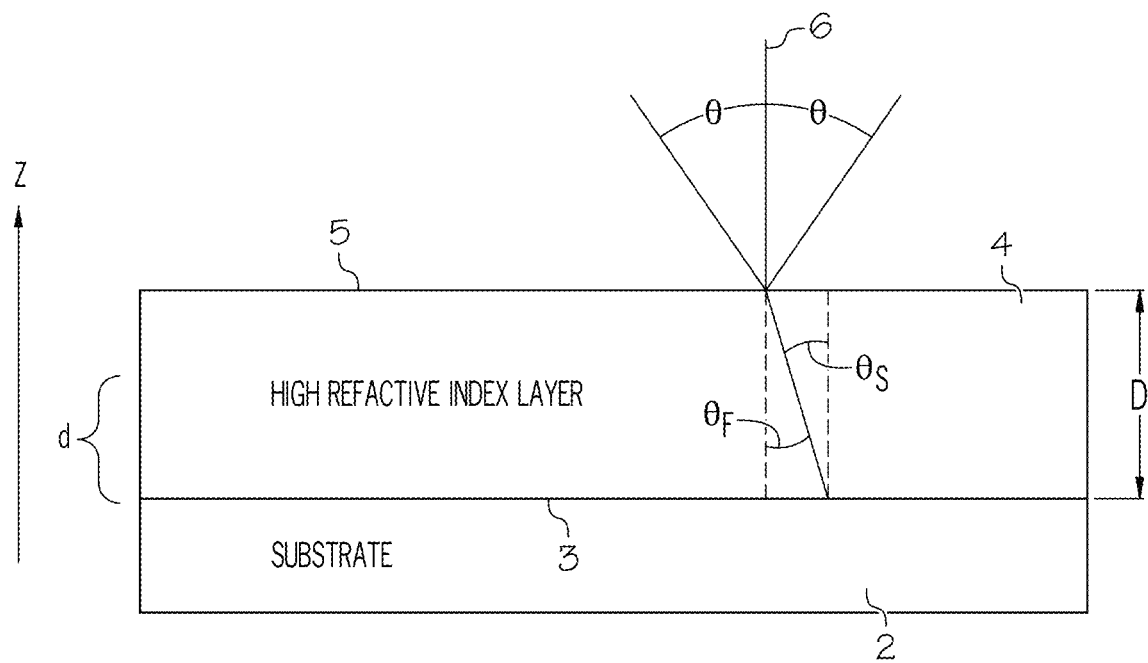
FIG. 3 schematically depicts a thin film structure with a high refractive index layer extending over a substrate layer and exposed to electromagnetic radiation at an angle θ relative to a normal direction to the outer surface of the high refractive index layer.
Figure 4A:
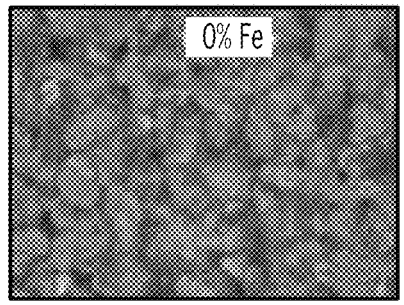
FIGS. 4A-4E are photographs of a comparative three-layer thin film structure and five-layer thin film structures according to embodiments disclosed and described herein.
Figure 4B:
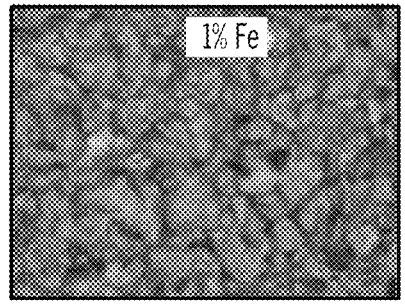
Figure 4C:
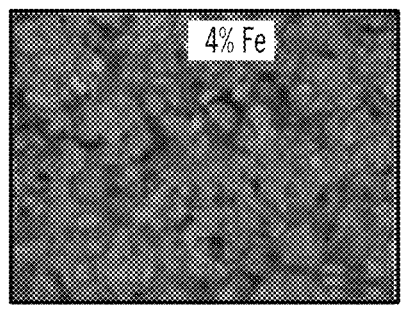
Figure 4D:
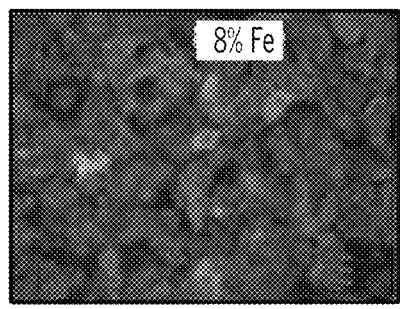
Figure 4E:
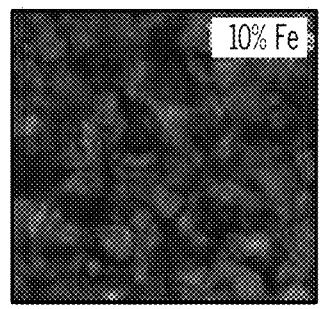

FIG. 3 and the following discussion provide a method for calculating the thickness of a zero or near-zero electric field point at a given wavelength of light, according to embodiments. For the purposes of the present specification, the term "near-zero" is defined $|E|^2 \leq 10$. FIG. 3 illustrates a five-layer thin film with a high refractive index layer 4 having a total thickness "D", an incremental thickness "d" and an index of refraction "n" on a substrate layer 2 having an index of refraction "$n_s$". The substrate layer 2 can be a reflector of a five-layer thin film. Incident light strikes the outer surface 5 of the high refractive index layer 4 at angle θ relative to line 6, which is perpendicular to the outer surface 5, and reflects from the outer surface 5 at the same angle θ. Incident light is transmitted through the outer surface 5 and into the high refractive index layer 4 at an angle $\theta_F$ relative to the line 6 and strikes the surface 3 of substrate layer 2 at an angle $\theta_s$. For a single high refractive index layer, $\theta_s = \theta_F$ and the energy/electric field (E) can be expressed as E(z) when z=d. From Maxwell's equations, the electric field can be expressed for s polarization as:

$$E^\omega(d) = \{u(z), 0, 0\} \exp(ik\alpha y)|_{z=d} \quad (3)$$

and for p polarization as:

$$E^\omega(d) = \left\{0, u(z), -\frac{\alpha}{\tilde{\varepsilon}(z)} v(z)\right\} \exp(ik\alpha y)|_{x=d} \quad (4)$$

where $$k = \frac{2\pi}{\lambda},$$

λ is a desired wavelength to be reflected, $\alpha = n_s \sin \theta_s$ where "s" corresponds to the substrate in FIG. 5, and $\tilde{\varepsilon}(z)$ is the permittivity of the layer as a function of z. As such:

$$|E(d)|^2 = |u(z)|^2 \exp(2ik\alpha y)|_{z=d} \quad (5)$$

for s polarization, and $$|E(d)|^2 = \left[|u(z)|^2 + \left|\frac{\alpha}{\sqrt{n}} v(z)\right|^2\right] \exp(2ik\alpha y)|_{z=d} \quad (6)$$

for p polarization.

It should be appreciated that variation of the electric field along the Z direction of the high refractive index layer 4 can be estimated by calculation of the unknown parameters u(z) and v(z), where it can be shown that:

$$\begin{pmatrix} u \\ v \end{pmatrix}_{z=d} = \begin{pmatrix} \cos \varphi & (i/q) \sin \varphi \\ iq \sin \varphi & \cos \varphi \end{pmatrix} \begin{pmatrix} u \\ v \end{pmatrix}_{z=0,substrate} \quad (7)$$

where 'i' is the square root of −1. Using the boundary conditions $u|_{z=0}=1$, $v|_{z=0}=q_s$, and the following relations:

$$q_s = n_s \cos \theta_s \text{ for s-polarization} \quad (8)$$

$$q_s = n_s / \cos \theta_s \text{ for p-polarization} \quad (9)$$

$$q = n \cos \theta_F \text{ for s-polarization} \quad (10)$$

$$q = n / \cos \theta_F \text{ for p-polarization} \quad (11)$$

$$\varphi = k \cdot n \cdot d \cos(\theta_F) \quad (12)$$

u(z) and v(z) can be expressed as:

$$u(z)|_{z=d} = u|_{z=0} \cos \varphi + v|_{z=0}\left(\frac{1}{q}\sin \varphi\right) = \cos \varphi + \frac{iq_s}{q}\sin \varphi \text{ and} \quad (13)$$

$$v(z)|_{z=d} = iqu|_{z=0} \sin \varphi + v|_{z=0} \cos \varphi = iq \sin \varphi + q_s \cos \varphi \quad (14)$$

Therefore:

$$|E(d)|^2 = \left[\cos^2\varphi + \frac{q_s^2}{q^2}\sin^2\varphi\right]e^{2ik\alpha y} = \left[\cos^2\varphi + \frac{n_s^2}{n^2}\sin^2\varphi\right]e^{2ik\alpha y} \quad (15)$$

for s polarization with $\varphi = k \cdot n \cdot d \cos(\theta_F)$, and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] \quad (16)$$

$$= \left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s \sin\theta_s = n \sin \theta_F \quad (17)$$

$$q_s = \frac{n_s}{\cos \theta_s} \text{ and} \quad (18)$$

$$q_s = \frac{n}{\cos \theta_F} \quad (19)$$

Thus, for a simple situation where $\theta_F = 0$ or normal incidence, $\varphi = k \cdot n \cdot d$, and $\alpha = 0$:

$$|E(d)|^2 \text{ for } s-\text{polarization} = \quad (20)$$

$$|E(d)|^2 \text{ for } p-\text{polarization} = \left[\cos^2\varphi + \frac{n_s^2}{n^2}\sin^2\varphi\right]$$

$$= \left[\cos^2(k \cdot n \cdot d) + \frac{n_s^2}{n^2}\sin^2(k \cdot n \cdot d)\right] \quad (21)$$

which allows for the thickness "d" to be solved for (i.e., the position or location within the high refractive index layer where the electric field is zero). It should be appreciated that the above equations can be tailored to absorb and reflect light in other wavelengths. Using the above equations, the position of the metallic iron absorber layer can be determined by solving for the thickness.

According to the above, the high refractive index layer thickness and the metallic iron absorber thickness can be modified to have a thickness that will meet the near-zero electric field as described above. For instance, where near zero energy is present or |Ed=d0|=0 points at some locations. For a specific wavelength A, when a thin metallic iron absorber layer is placed at this point (d0), it does not find any energy to absorb at that wavelength but absorbs at other wavelengths with non-zero energy. For instance, for the wavelength 434 nm one can select location of the metallic iron absorber when |E|d=d0=0 such that light of 434 nm is not absorbed and remains transparent, whereas other wavelengths of non-zero E field are absorbed.

With reference again to FIGS. 2A and 2B, according to embodiments, the reflector 210 may be a layer formed from reflective material or the reflector 210 may be a discrete particle having any shape. In embodiments, the reflector 210 can have a thickness from 10 nm to 5000 nm (5 microns (μm)), such as from 50 nm to 1000 nm, from 100 nm to 600 nm, from 125 nm to 400 nm, from 150 nm to 300 nm, or from 175 nm to 250 nm. In embodiments, the reflector 210 has a thickness from 10 nm to 400 nm, such as from 10 nm to 375 nm, from 10 nm to 350 nm, from 10 nm to 325 nm, from 10 nm to 300 nm, from 10 nm to 275 nm, from 10 nm to 250 nm, from 10 nm to 225 nm, from 10 nm to 200 nm, from 10 nm to 175 nm, from 10 nm to 150 nm, from 10 nm to 125 nm, from 10 nm to 100 nm, from 10 nm to 75 nm, from 10 nm to 50 nm, or from 10 nm to 25 nm. In embodiments, the reflector 210 can be made from at least one of a "gray metallic" material, such as Al, Ag, Pt, Sn; at least one of a "colorful metallic" material, such as Au, Cu, brass, bronze, TiN, Cr, or a combination thereof. In some embodiments, the reflector is Al.

According to embodiments, a high refractive index layer 220 is deposited on the reflector 210 or encapsulates the reflector 210. The high refractive index layer 220 may be deposited on the reflector 210 by any suitable method, such as, for example, CVD, ALD, wet chemistry processes, and PVD. The high refractive index layer 220 can, according to embodiments, have a thickness from 5 nm to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. In some embodiments, the high refractive index layer 220 can have a thickness from 5 nm to 450 nm, such as from 5 nm to 400 nm, from 5 nm to 350 nm, from 5 nm to 300 nm, from 5 nm to 250 nm, from 5 nm to 200 nm, from 5 nm to 150 nm, from 5 nm to 100 nm, or from 5 nm to 50 nm. In embodiments, the high refractive index layer 220 can have a thickness from 50 nm to 450 nm, such as from 100 nm to 400 nm, from 150 nm to 350 nm, or from 200 nm to 300 nm. In embodiments, the high refractive index layer 220 can be made from at least one colorful dielectric material such as $Fe_2O_3$, TiN, or a combination thereof. In other embodiments, the high refractive index layer 220 may be a dielectric material selected from the group consisting of ZnS, $ZrO_2$, $CeO_2$$HfO_2$, $TiO_2$, or combinations thereof. According to some embodiments, the high refractive index layer 220 may be selected from ZnS, $Fe_2O_3$, $TiO_2$, or combinations thereof. According to one or more embodiments, the $TiO_2$ may be rutile phase, anatase phase, or a combination thereof. In embodiments, the high refractive index layer 220 is comprised of one or more metal oxides.

According to embodiments a metallic iron absorber layer 230 may be deposited on the high refractive index layer 220 or encapsulate the high refractive index layer 220. The metallic iron absorber layer 230 can, in embodiments, have a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, or from 15 nm to 20 nm. In embodiments, the metallic iron absorber layer 230 can have a thickness from 5 nm to 15 nm, such as from 5 nm to 10 nm, or from 10 nm to 15 nm. In embodiments, the metallic iron absorber layer 230 is made from metallic iron (Fe).

According to embodiments where the high refractive index layer 220 is iron oxide ($Fe_2O_3$), the metallic iron absorber layer 230 is formed by subjecting the iron oxide high refractive index layer 220 to reducing agents and reducing the iron oxide to metallic iron, thereby forming the metallic iron absorber layer. The thickness of the metallic iron absorber layer 230 can be controlled by adjusting the amount of the reducing agents that are used, by adjusting the conditions under which the reduction occurs (such as temperature and pressure, or by adjusting the duration of the reduction. It should be understood that in embodiments where the high refractive index layer 220 is iron oxide, the thickness of the iron oxide deposited as the high refractive index layer 220 should be adjusted (i.e., increased) to account for the thickness of the metallic iron absorber layer 230. As an example, in embodiments where the high refractive index layer 220 is iron oxide and the desired thickness of the high refractive index layer 220 is 200 nm and the desired thickness of the metallic iron absorber layer is 20 nm, iron oxide having a thickness of 220 nm should be deposited on the reflector 210 (i.e., the desired thickness of the high refractive index layer 220 plus the desired thickness of the metallic iron absorber layer 230).

The metallic iron layer can be obtained by the reaction of a deposited iron oxide layer and reducing gases, such as hydrogen ($H_2$), carbon monoxide (CO), carbon dioxide ($CO_2$), or mixtures including $H_2$—CO, CO—$CO_2$, $H_2$—CO—$CO_2$, $H_2$—CO—$CO_2$—$CH_4$ at elevated temperatures. In embodiments, various iron oxides can be hematite ($Fe_2O_3$), magnetite ($Fe_3O_4$), ferrous oxide (FeO), or mixtures of these iron oxides. Hematite ($Fe_2O_3$) is used for illustration below.

Reduction of iron oxide to Fe by Hydrogen

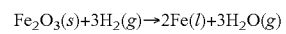

$$Fe_2O_3(s)+3H_2(g) \rightarrow 2Fe(l)+3H_2O(g)$$

Reduction of iron oxide to Fe by Carbon Monoxide

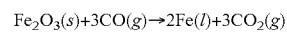

$$Fe_2O_3(s)+3CO(g) \rightarrow 2Fe(l)+3CO_2(g)$$

The kinetics of iron oxide reduction reactions may be influenced by various parameters. In addition to process parameters, (e.g., temperature, pressure, and gas composition) the reaction time, the properties of the material to be reduced (e.g., grain size, morphology, and porosity) have an influence on the reduction performance. The various reaction conditions may be fine tuned in embodiments to achieve precise control of the metallic iron (Fe) layer composition, density and thickness.

In general, the rate of diffusion and phase boundary reaction accelerates with increasing temperature. From a thermodynamic point of view, iron oxide reduction can proceed at low temperatures. The gas utilization that can be reached at low temperatures is insufficient due to the kinetic limitations. Therefore, a certain temperature is required such as 220° C. to reach a gas utilization. Though a higher temperature is beneficial for both thermodynamics and kinetics of the iron oxide reduction. For this case, lower temperature range 200-450° C. is desired to avoid damage on Al core and to achieve a better control in Fe layer thickness. In addition to temperature, pressure may also have an influence on the reduction rate. With increasing pressure and constant partial pressure of reducing gas in the gas (higher molar flow), an increase in the reduction rate can be observed. The composition of the reducing gas is also one of the most important factors controlling the reduction rate.

According to embodiments where the high refractive index layer 220 is not iron oxide ($Fe_2O_3$), the metallic iron absorber layer 230 is formed by first depositing an iron oxide layer on the high refractive index layer 220, or by encapsulating the high refractive index layer 220 with iron oxide. The iron oxide may be deposited on the high refractive index layer by CVD or wet chemistry processes, or the high refractive index layer 220 may be encapsulated by iron oxide using CVD or wet chemistry processes, such that the iron oxide on the high refractive index layer 220 has the desired thickness of the metallic iron absorber layer 230, such as the thicknesses disclosed above. Once the iron oxide is present on the high refractive index layer 210, the iron oxide is subjected to reducing agents and reduced from iron oxide to metallic iron, thereby forming the metallic iron absorber layer. In some embodiments, all of the iron oxide is reduced to metallic iron. In other embodiments, a portion of the iron oxide is reduced to metallic iron. In some embodiments where only a portion of the iron oxide is reduced to metallic iron; the thickness of the remaining iron oxide is minimized.

According to embodiments, and with reference to FIG. 2A, a five-layer thin film structure 200 may comprise an aluminum reflector 210; a high refractive index layer 220 comprising iron oxide ($Fe_2O_3$) on the aluminum reflector 210; and a metallic iron absorber layer 230 on the iron oxide high refractive index layer 220. By changing the high refractive index layer 220 thickness and, thereby, metallic iron absorber layer position, the five-layer thin film structure can reflect a variety of electromagnetic radiation within the visible spectrum.

The aluminum reflector, has a thickness from 10 nm to 400 nm, such as from 10 nm to 375 nm, from 10 nm to 350 nm, from 10 nm to 325 nm, from 10 nm to 300 nm, from 10 nm to 275 nm, from 10 nm to 250 nm, from 10 nm to 225 nm, from 10 nm to 200 nm, from 10 nm to 175 nm, from 10 nm to 150 nm, from 10 nm to 125 nm, from 10 nm to 100 nm, from 10 nm to 75 nm, from 10 nm to 50 nm, or from 10 nm to 25 nm. The iron oxide high refractive index layer has a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. And, the metallic iron absorber layer has a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, from 15 nm to 20 nm, from 5 nm to 15 nm, from 10 nm to 15, or from 5 nm to 10 nm.

According to embodiments, and with reference again to FIG. 2A, a five-layer thin film structure 200 may comprise an aluminum reflector 210; a high refractive index layer 220 comprising $TiO_2$ (rutile phase or anatase phase) on the aluminum reflector 210; and a metallic iron absorber layer 230 on the $TiO_2$ (rutile phase or anatase phase) high refractive index layer 220. By changing the high refractive index layer 220 thickness and, thereby, metallic iron absorber layer position, the five-layer thin film structure can reflect a variety of electromagnetic radiation within the visible spectrum.

The aluminum reflector, has a thickness from 10 nm to 400 nm, such as from 10 nm to 375 nm, from 10 nm to 350 nm, from 10 nm to 325 nm, from 10 nm to 300 nm, from 10 nm to 275 nm, from 10 nm to 250 nm, from 10 nm to 225 nm, from 10 nm to 200 nm, from 10 nm to 175 nm, from 10 nm to 150 nm, from 10 nm to 125 nm, from 10 nm to 100 nm, from 10 nm to 75 nm, from 10 nm to 50 nm, or from 10 nm to 25 nm. The $TiO_2$ (rutile phase or anatase phase) high refractive index layer has a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. And, the metallic iron absorber layer has a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, from 15 nm to 20 nm, from 5 nm to 15 nm, from 10 nm to 15, or from 5 nm to 10 nm.

According to embodiments, and with reference to FIG. 2A, a five-layer thin film structure 200 may comprise an aluminum reflector 210; a high refractive index layer 220 comprising ZnS on the aluminum reflector 210; and a metallic iron absorber layer 230 on the ZnS high refractive index layer 220. By changing the high refractive index layer 220 thickness and, thereby, metallic iron absorber layer position, the five-layer thin film structure can reflect a variety of electromagnetic radiation within the visible spectrum.

The aluminum reflector has a thickness from 10 nm to 400 nm, such as from 10 nm to 375 nm, from 10 nm to 350 nm, from 10 nm to 325 nm, from 10 nm to 300 nm, from 10 nm to 275 nm, from 10 nm to 250 nm, from 10 nm to 225 nm, from 10 nm to 200 nm, from 10 nm to 175 nm, from 10 nm to 150 nm, from 10 nm to 125 nm, from 10 nm to 100 nm, from 10 nm to 75 nm, from 10 nm to 50 nm, or from 10 nm to 25 nm; the ZnS high refractive index layer has a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm; and the metallic iron absorber layer has a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, from 15 nm to 20 nm, from 5 nm to 15 nm, from 10 nm to 15, or from 5 nm to 10 nm.

According to embodiments, and with reference to FIG. 2B, a five-layer thin film structure may comprise an aluminum reflector 210; a high refractive index layer 220 comprising iron oxide ($Fe_2O_3$) encapsulating the reflector 210; and a metallic iron absorber layer 230 encapsulating the high refractive index layer 220 comprising iron oxide ($Fe_2O_3$). By changing the high refractive index layer 220 thickness and, thereby, metallic iron absorber layer position, the five-layer thin film structure can reflect a variety of electromagnetic radiation within the visible spectrum.

The aluminum reflector has a thickness from 10 nm to 400 nm, such as from 10 nm to 375 nm, from 10 nm to 350 nm, from 10 nm to 325 nm, from 10 nm to 300 nm, from 10 nm to 275 nm, from 10 nm to 250 nm, from 10 nm to 225 nm, from 10 nm to 200 nm, from 10 nm to 175 nm, from 10 nm to 150 nm, from 10 nm to 125 nm, from 10 nm to 100 nm, from 10 nm to 75 nm, from 10 nm to 50 nm, or from 10 nm to 25 nm. The iron oxide ($Fe_2O_3$) high refractive index layer has a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. And, the metallic iron absorber layer has a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, or from 15 nm to 20 nm.

According to embodiments, and with reference to FIG. 2B, a five-layer thin film structure may comprise an aluminum reflector 210; a high refractive index layer 220 comprising $TiO_2$ (rutile phase or anatase phase) encapsulating the reflector 210; and a metallic iron absorber layer 230 encapsulating the high refractive index layer 220 comprising $TiO_2$ (rutile phase and anatase phase). By changing the high refractive index layer 220 thickness and, thereby, metallic iron absorber layer position, the five-layer thin film structure can reflect a variety of electromagnetic radiation within the visible spectrum.

The aluminum reflector has a thickness from 10 nm to 400 nm, such as from 10 nm to 375 nm, from 10 nm to 350 nm, from 10 nm to 325 nm, from 10 nm to 300 nm, from 10 nm to 275 nm, from 10 nm to 250 nm, from 10 nm to 225 nm, from 10 nm to 200 nm, from 10 nm to 175 nm, from 10 nm to 150 nm, from 10 nm to 125 nm, from 10 nm to 100 nm, from 10 nm to 75 nm, from 10 nm to 50 nm, or from 10 nm to 25 nm. The $TiO_2$ (rutile phase or anatase phase) high refractive index layer has a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm And, the metallic iron absorber layer has a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, from 15 nm to 20 nm, from 5 nm to 15 nm, from 10 nm to 15, or from 5 nm to 10 nm.

According to embodiments, and with reference to FIG. 2B, a five-layer thin film structure may comprise an aluminum reflector 210; a high refractive index layer 220 comprising ZnS encapsulating the reflector 210; and a metallic iron absorber layer 230 encapsulating the high refractive index layer 220 comprising ZnS. By changing the high refractive index layer 220 thickness and, thereby, metallic iron absorber layer position, the five-layer thin film structure can reflect a variety of electromagnetic radiation within the visible spectrum.

The aluminum reflector has a thickness from 10 nm to 400 nm, such as from 10 nm to 375 nm, from 10 nm to 350 nm, from 10 nm to 325 nm, from 10 nm to 300 nm, from 10 nm to 275 nm, from 10 nm to 250 nm, from 10 nm to 225 nm, from 10 nm to 200 nm, from 10 nm to 175 nm, from 10 nm to 150 nm, from 10 nm to 125 nm, from 10 nm to 100 nm, from 10 nm to 75 nm, from 10 nm to 50 nm, or from 10 nm to 25 nm. The ZnS high refractive index layer has a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. And, the metallic iron absorber layer has a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, or from 15 nm to 20 nm.

Hue can be defined as $\tan^{-1}(a^*/b^*)$. The hue can also be referred to as the angle relative to the positive $a^*$-axis of a given data point. A hue value provides a measure of the color displayed by an object (e.g., red, green, blue, yellow etc.). Embodiments of the five-layer thin film described herein have a hue from 0° to 120°, such as from 0° to 100°, from 0° to 80°, from 0° to 60°, from 0° to 40°, or from 0° to 20°. In embodiments, a hue shift is less than 30°, such as less than 25°, less than 20°, less than 15°, or less than 10° in the Lab color space when viewed at angles from 0° to 45°.

According to embodiments, five-layer thin film structures disclosed and described herein may be used in paints, polymers, polymers or coatings. In embodiments, the multilayer thin film structures described herein may be incorporated into a liquid carrier, such as an organic or inorganic binder, and utilized in a paint or similar coating system, which may be applied to an article of manufacture, thereby imparting the omnidirectional reflectivity properties of the five-layer thin film structure to the article. In some embodiments, five-layer thin film structure may be dispersed in a polymer matrix such that the five-layer thin film structures are randomly oriented in the matrix. Thereafter, the paint, coating, or polymer comprising the five-layer thin film structure may be deposited on an article of manufacture by spraying, electrostatic charging, powder coating, and the like. The deposited coating thereby imparting the reflectance or shimmer of the metallic component or the omnidirectional reflectivity properties of the five-layer thin film structure to the article to which it is applied.

According to embodiments, at least one of paint binders and fillers can be used and mixed with the pigments to provide a paint that displays an omnidirectional structural color. In addition, other additives may be added to the five-layer thin film to aid the compatibility of five-layer thin film in the paint system. Exemplary compatibility-enhancing additives include silane surface treatments that coat the exterior of the five-layer thin film and improve the compatibility of five-layer thin film in the paint system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Example

Embodiments will be further clarified by the following example.

To show the effects of five-layer thin film structures having a metallic iron absorber layer, one three-layer thin film structure without a metallic iron absorber layer (Comparative Sample) was formed and four five-layer thin film structures having a metallic iron absorber layer (Samples 1-4) were made. The three-layer thin film structure (Comparative Sample) had an aluminum reflector encapsulated by an iron oxide high refractive index layer. The three-layer thin film structure is commercially available from BASF Corporation.

To form the four five-layer thin film structures having a metallic iron absorber layer (Samples 1-4), the three-layer thin film structure described above was subjected to reducing agents, which formed a metallic iron layer on the outer surface of the iron oxide high refractive index layer. The thickness of the metallic iron absorber layer was increased in each of the four five-layer thin film structures. The thickness of the metallic iron absorber layer is measured as a percentage of the iron oxide high refractive index layer. Accordingly, if the iron oxide high refractive index layer is 100 nm thick and the metallic iron absorber layer is measured as a thickness of 5%, the metallic iron absorber layer has a thickness of 5 nm. Table 1 below provides the thickness of the metallic iron absorber layer.

TABLE 1

| Sample | No. of Layers | Thickness of Metallic Iron Absorber Layer |
|---|---|---|
| Comparative Sample | 3 | 0% |
| Sample 1 | 5 | 1% |
| Sample 2 | 5 | 4% |
| Sample 3 | 5 | 8% |
| Sample 4 | 5 | 10% |

FIGS. 4A-4E show the color of the structures of the Comparative Sample and Samples 1-4, respectively. FIGS. 4A-4E show that the red color of the structures can be tuned by adjusting the thickness of the metallic iron absorber layer. Samples 3 and 4 (having metallic iron absorber layer thicknesses of 8% and 10%, respectively) have dark, less attractive color. However, Sample 2, which has a metallic iron absorber layer with a thickness of 4% has an attractive red color.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A five-layer thin film structure comprising:
   a reflector;
   a high refractive index layer on or encapsulating the reflector; and
   a metallic iron absorber layer on or encapsulating the high refractive index layer, wherein
   the five-layer thin film structure has a hue shift less than 30° in the Lab color space when viewed at angles from 0° to 45°.

2. The five-layer thin film structure of claim 1, wherein the reflector comprises aluminum.

3. The five-layer thin film structure of claim 1, wherein the reflector has a thickness from 10 nm to 5000 nm.

4. The five-layer thin film structure of claim 1, wherein the high refractive index layer comprises iron oxide, zinc sulfide, or titanium dioxide.

5. The five-layer thin film structure of claim 1, wherein the high refractive index layer has a thickness from 5 nm to 500 nm.

6. The five-layer thin film structure of claim 1, wherein the metallic iron absorber layer has a thickness from 5 nm to 20 nm.

7. The five-layer thin film structure of claim 1, wherein the reflector is aluminum and the high refractive index layer is zinc sulfide.

8. The five-layer thin film structure of claim 7, wherein the reflector has a thickness from 10 nm to 5000 nm.

9. The five-layer thin film structure of claim 7, wherein the high refractive index layer has a thickness from 5 nm to 500 nm.

10. The five-layer thin film structure of claim 7, wherein the metallic iron absorber layer has a thickness from greater than 0 nm to 50 nm.

11. The five-layer thin film structure of claim 1, wherein the reflector is aluminum and the high refractive index layer is titanium dioxide.

12. The five-layer thin film structure of claim 11, wherein the reflector has a thickness from 10 nm to 5000 nm.

13. The five-layer thin film structure of claim 11, wherein the high refractive index layer has a thickness from 5 nm to 500 nm.

14. The five-layer thin film structure of claim 11, wherein the metallic iron absorber layer has a thickness from greater than 0 nm to 50 nm.

15. The five-layer thin film structure of claim 1, wherein the metallic iron absorber layer is deposited by chemical vapor deposition or by reacting a deposited iron oxide layer and reducing gases comprising hydrogen ($H_2$), carbon monoxide (CO), carbon dioxide ($CO_2$), or combinations thereof.

16. A five-layer thin film structure comprising:
   an aluminum reflector;
   an iron oxide high refractive index layer on or encapsulating the aluminum reflector; and
   a metallic iron absorber layer on or encapsulating the iron oxide high refractive index layer, wherein
   the five-layer thin film structure has a hue shift less than 30° in the Lab color space when viewed at angles from 0° to 45°.

17. The five-layer thin film structure according to claim 16, wherein the aluminum reflector has a thickness from 10 nm to 5000 nm.

18. The five-layer thin film structure of claim 16, wherein the iron oxide high refractive index layer has a thickness from 5 nm to 500 nm.

19. The five-layer thin film structure of claim 16, wherein the metallic iron absorber layer has a thickness from greater than 0 nm to 50 nm.

20. The five-layer thin film structure of claim 16, wherein
   the aluminum reflector has a thickness from 10 nm to 5000 nm;
   the iron oxide high refractive index layer has a thickness from 5 nm to 500 nm; and
   the metallic iron absorber layer has a thickness from greater than 0 nm to 50 nm.

* * * * *